United States Patent [19]

Kronk

[11] 4,149,139
[45] Apr. 10, 1979

[54] ULTRASONIC TRANSMISSION DEVICE

[75] Inventor: Richard E. Kronk, Granby, Conn.

[73] Assignee: Combustion Engineering, Inc., Windsor, Conn.

[21] Appl. No.: 812,089

[22] Filed: Jul. 1, 1977

[51] Int. Cl.² .............................................. G01S 9/66
[52] U.S. Cl. .................................... 340/3 R; 181/400;
310/333; 310/335; 340/1 R
[58] Field of Search ............... 181/123, 139, 140, 142,
181/400; 340/8 FT, 8 L, 8 MM, 1 R, 15, 3 R;
310/333, 335, 336

[56] References Cited
U.S. PATENT DOCUMENTS

| 2,525,861 | 10/1950 | Carlin | 310/336 X |
| 3,302,044 | 1/1967 | Lynnworth et al. | 310/333 |
| 3,378,792 | 4/1968 | Holton | 310/335 |
| 3,575,050 | 4/1971 | Lynnworth | 340/3 D X |
| 3,914,718 | 10/1975 | Puyhaubert et al. | 310/335 |

Primary Examiner—Richard A. Farley

Attorney, Agent, or Firm—Joseph H. Born; Richard H. Berneike

[57] ABSTRACT

A method and apparatus for transmission of ultrasound to and reception of ultrasound from a fluid from outside its container. An ultrasonic transducer generates sound waves longitudinally in a transmission bar that has a reflecting surface at such an angle with the ultrasonic path that the longitudinal waves are internally reflected as shear waves in the direction of an interface between the transmission bar and the fluid. The impinging of the shear-mode waves on the interface results in an efficient transmission of energy into the fluid and an efficient reception of echo signals from the fluid. Since longitudinal waves are coupled from the transducer to the metal, a rigid bond between transducer and metal is unnecessary. The coupling may be achieved by means of a liquid-filled interface that does not subject the delicate transducer to damage from stresses produced by differential thermal expansions.

4 Claims, 7 Drawing Figures

ULTRASONIC TRANSMISSION DEVICE

BACKGROUND OF THE INVENTION

The license for a nuclear steam generating system stipulates the maximum allowable thermal power that the system may produce. The actual measured power that it produces must be less than the allowable power by an amount equal to the uncertainty in the power measurement. Therefore, power measurement accuracy is of continuing importance to the nuclear-power industry, and flow-measurement accuracy, the limiting factor in power measurement, is critically important. As a result of this importance, various methods of measuring the flow have been tried, with particular emphasis on ultrasonic methods. Typically, extremely high-frequency sound waves are sent into the fluid, and the echoes that return from the fluid give an indication of the velocity of the fluid. If the velocity distribution across the cross section of fluid flow is known, the volume rate of coolant flow can be determined.

One of the problems that must be addressed at the outset in designing an ultrasonic fluid-flow measuring system is that of how to propagate the ultrasonic waves into the medium and detect them when they return. The straightforward method of doing this is to place an ultrasonic transducer in contact with the fluid. This means that the transducer is placed within the pressure boundary of the fluid conduit. This can result in an efficient transmission of ultrasonic energy into the fluid and a reception of echoes with a minimum of attenuation. However, ultrasonic systems in which the transducers penetrate to points within the pressure boundary are not preferred.

A way to avoid penetrating the pressure boundary is simply to propagate the waves through the metal that makes up the coolant conduit. The main problem with this method is that it is difficult to get a good transmission of energy across the steel-coolant boundary. If a longitudinal wave is aimed in a direction normal to the interface, the difference in sonic impedances between the two media will cause a reflection of the bulk of the energy back into the steel, ultimately causing a sequence of pulses in response to the original transducer pulse. Only a small part of the energy of each pulse is transmitted into the coolant, and only a small part of the reflection to be detected is transmitted back into the steel from the coolant. Accordingly, a straightforward propagation of the ultrasound directly through the pipe and into the coolant is not very efficient.

One way of avoiding the inefficient transmission of energy across the interface is to transmit shear waves, rather than longitudinal waves, to the interface. If the shear waves impinge on the interface at an appropriate angle, a relatively efficient transmission of energy into the fluid is obtained. However, this assumes that the transducer can effectively propagate shear-mode waves from a transducer into the steel. Unfortunately, in order to do this, it is necessary to have a very rigid bonding between the transducer and the steel. The result of this is that the transducer is subjected to thermally induced stresses as the bond is heated and cooled during operation of the plant. Accordingly, the use of a transducer to transmit shear-mode waves into the steel is not very practical, because either the bond or the transducer will tend to deteriorate.

An indirect method of propagating the ultrasound through the pipe and into the coolant that appears to avoid these problems is the placing of a plastic wedge between the transducer and the coolant pipe. The transducer propagates longitudinal waves through the plastic, and the ultrasound impinges upon the plastic-steel interface at such an angle that a mode conversion occurs, and at least some of the energy is transmitted into the steel as shear-mode waves. The resultant shear-mode waves can be obliquely transmitted across the steel-coolant interface, thereby resulting in less loss during transmission and reception across the interface. Though this would seem to be the ideal arrangement, it also has its drawbacks. The plastic is an extremely lossy medium, so the attenuation that is avoided at the interfaces is encountered in traveling through the plastic wedge.

SUMMARY OF THE INVENTION

According to the present invention, longitudinal waves are introduced into a solid medium that is metallurgically bonded to the pressure boundary materials and has controlled surfaces both inside and outside the pressure boundary. A reflecting surface is provided in the solid medium at such an angle with the path of the ultrasound emitted from the transducer that it is reflected at least partially as a shear wave. An interface between the solid medium and the liquid medium is provided in the path of the reflected shear wave at such an angle that an effective transmission across the interface into the liquid medium can be accomplished. A second interface, typically the same interface as the one across which the sound was transmitted into the liquid medium, is provided for receiving sound waves that have been reflected off objects within the liquid medium. The second interface is oriented at such an angle that the longitudinal waves from the liquid are at least partially changed to shear waves in traveling across the boundary; at the correct angle this causes an effective retransmission into the steel. A second reflecting surface is provided, typically the same reflecting surface as the first reflecting surface, and it is arranged at such an angle as to effect a mode conversion from a shear wave back to a longitudinal wave. This puts the signal in appropriate form for reception by a transducer arranged to receive longitudinal-mode signals. In this manner, both the medium losses of a plastic wedge and the interface losses of a longitudinal-to-longitudinal transmission are avoided.

BRIEF DESCRIPTION OF THE DRAWINGS

These and further features and advantages of the invention become evident in the description of the embodiment shown in the drawings attached, wherein.

DETAILED DESCRIPTION OF THE PREFERRED EMBODIMENT

Figure 1:
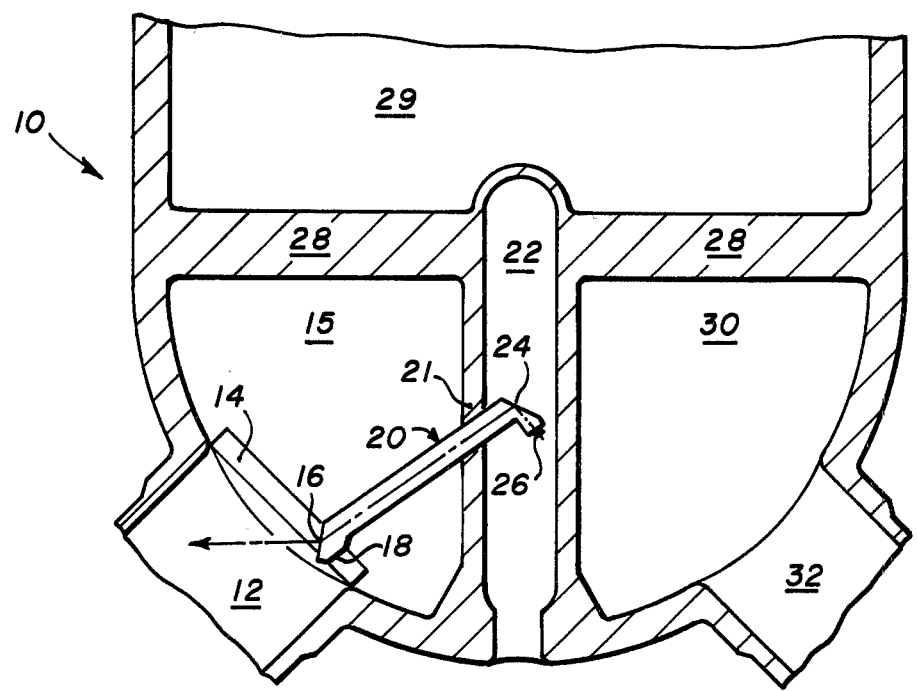
FIG. 1 is a simplified cross-sectional view of a steam generator showing the position of the transmission bar of the present invention.

FIG. 1 shows the location of the transmission bar of the present invention in the interior of a steam generator for a pressurized-water nuclear reactor. The purpose of transmission bar 20 is to provide a path for sound waves generated by transducer 26 to be transmitted into fluid that exists in hot-leg inlet 12. The fluid in hot-leg inlet 12 is coolant that has been heated to a high temperature by the operating nuclear reactor. The coolant enters steam generator 10 through hot leg 12 and passes into tube sheet 28. Tube sheet 28 is the entrance to hundreds of U-shaped tubes that are arranged above tube sheet 28. Plenum 15 is kept isolated from plenum 30, so coolant entering tube sheet 28 from plenum 15 can only pass into the upper part of steam generator 10 by traveling through the interiors of the U-tubes. Once in the U-tubes, this *primary coolant* gives up its heat to the *secondary coolant* that surrounds the U-tubes and then returns to plenum 30 through the right side of tube sheet 28. The primary coolant leaving plenum 30 passes through cold-leg conduit 32, and it is ultimately returned to the reactor to absorb more heat.

Manway 22 is a dry area into which no coolant of any type is allowed to penetrate. Accordingly, it is exterior to the pressure boundary. It is in this region that ultrasonic signals are generated and in this region that ultrasonic echoes are received.

The transmission and reception is accomplished by means of ultrasonic transducer 26, which is suitably attached to transmission bar 20. Transmission bar 20 can be built to pass through pressure boundary 21 in any one of a number of ways. One way is to have the transmission bar built in two segments, one of which is welded to the outside of the pressure boundary (the inside of the manway), and the other part of which is welded to the interior of the pressure boundary. Because of the use to which the transmission bar is to be applied, care must be taken to ensure that these welds do not impair ultrasonic transmission. Another way to build transmission bar 20 is to slip the transmission bar through a bore in the pressure boundary and weld it by means of, say, flanges attached to the transmission bar. This would avoid the problem of ultrasonic integrity in the welds. If necessary, a support bar 14 can also be included in order to provide enough support to avoid stresses in transmission bar 20. In the alternative, the support could be provided by a seal lip ring, not shown, that is part of the steam generator structure.

Briefly, transmission bar 20 operates in the following manner. Transducer 26 generates ultrasonic signals that travel from the transducer to a reflecting surface 24, which is an interface between steel and air. Sound waves are reflected from surface 24 through the transmission bar to an interface 16, which is a steel surface in contact with the coolant. An energy absorbing and diffusing surface 18 is provided near interface 16 in order to dissipate energy reflected from it. Sound waves transmitted into the fluid travel along a straight path until they encounter discontinuities in the coolant. Such discontinuities might typically be eddies in the flow, entrained particles, or bubbles. The frequency of the ultrasound is in the megahertz range, so the ultrasound beam can be thought of more as a focussed ray of light than as an audio-range sound signal; the typical dispersion for a high-frequency ultrasound beam might be only one or two degrees of arc.

When the ultrasound hits a discontinuity that is smaller than the beam width, the part of the wave front that does not hit the discontinuity continues on its path, and the sound energy in the wave front that hits the discontinuity is absorbed, transmitted, reflected, or scattered, and it is typical for some of each of these effects to occur. As a result, at least some of the energy in the wave that hits the discontinuity retraces the path along which it was transmitted, and it thereby returns to the transducer, which is used for reception as well as transmission.

It is to be expected that any particle or bubble in the path of the ultrasound will cause an echo to travel back toward the transmission bar, since even a planar surface which would be expected to reflect the ultrasound energy with an angle equal to its angle of incidence, will scatter some portion of its energy. This effect is similar to the phenomenon seen when a flashlight is aimed at a mirror at an oblique angle. Though the light is expected to be reflected at an angle equal to the angle of incidence, but in the direction away from the flashlight, the person shining the flashlight will still be able to see the point at which the flashlight is aimed, since irregularities of various types cause some scattering. This phenomenon is known as *specular reflection,* and the extent to which a target exhibits this characteristic is known by the initiated as *shine.* Accordingly, though the energy incident upon a particle can be expected to be scattered in a number of different directions, part of it will be reflected back in the direction from which it came, so detection means positioned at the point of origin of the ultrasound can detect the particle. The length of time between generation of the pulse and detection of its echo will indicate the distance of the particle, and the change in distance observed after successive pulses will indicate its velocity.

Figure 2:
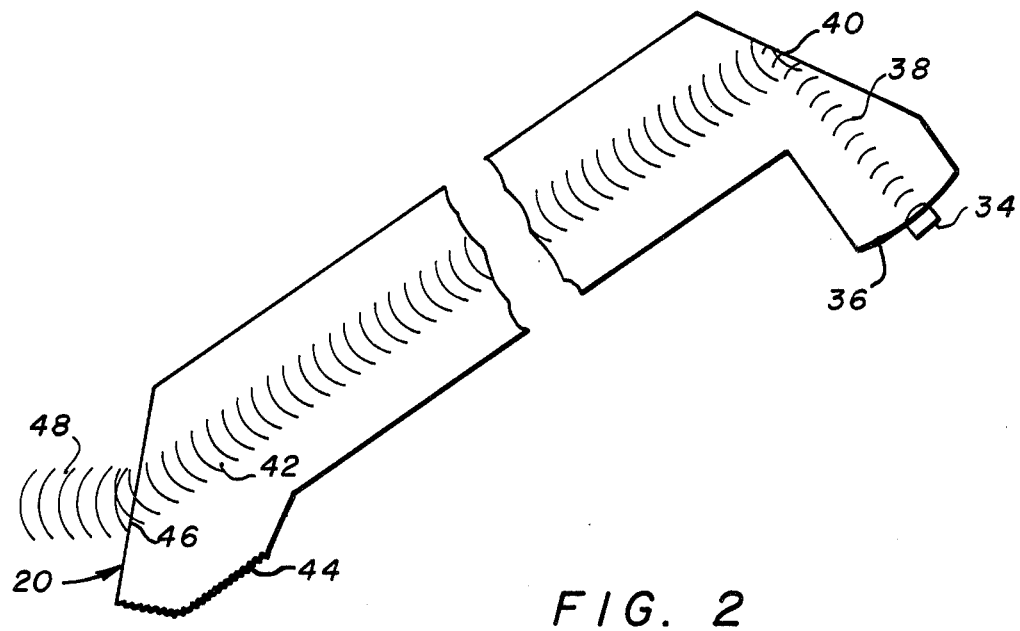
FIG. 2 is a cross-sectional view of the transmission bar of the present invention.

FIG. 2 shows a more detailed view of transmission bar 20 of FIG. 1, and elements 26, 24, 18 and 16 of FIG. 1 are rendered as elements 34, 40, 44 and 46, respectively, of FIG. 2. Transducer 34 is coupled to surface 36 of the transmission bar by appropriate means, such as spring loading with a liquid-filled interface. Since transducer 34 is to transmit longitudinal waves into the transmission bar, it is not necessary that there be rigid coupling between it and surface 36, as it would be if shear waves were to be transmitted. It is only necessary that the interface be free of air; accordingly, a fluid coupling too thin to produce reverberation is sufficient. Surface 36 is normal to a path 38 that impinges upon reflecting surface 40. Reflecting surface 40 is disposed at such an angle, shown in FIG. 2 as 65 degrees between path 38 and the normal to surface 40 as to cause longitudinal sound waves traveling along path 38 to be reflected at least partially as shear waves. For the specific angles shown in FIG. 2, in fact, the reflected energy is almost exclusively in the form of shear waves. These shear waves are then propagated along path 42 whose angle with surface 40, due to mode conversion, is not equal to the angle of incidence of path 34 with reflecting surface 40. Since reflecting surface 40 interfaces with air, the energy transmitted into air is negligible due to impedance differences between the steel and air media. Accordingly, almost no energy is lost due to the mode conversion at surface 40.

The shear waves traveling along path 42 strike surface 46, which is a steel-water interface. This is in contrast to surface 40, which is a steel-air interface. Interface 46 is arranged at such an angle as to cause the shear waves to be at least partially transmitted into the liquid medium as longitudinal waves, and longitudinal waves are thereby propagated along path 48. This arrangement is particularly advantageous because the transmission of sound energy from the solid medium into the liquid medium is most effective when the energy reaches the interface from the solid side as a shear wave. Some of the energy will be internally reflected at interface 46, so a serrated scattering surface 44 is included in order to absorb, dissipate, and attenuate the reflected signals, which are not used in the present invention, in order to prevent them from interfering with the received echoes. When the ultrasound waves traveling along path 48 encounter interferences in the coolant, such as minute entrained particles, bubbles, pressure gradients, or thermal gradients, a reflection of the sound wave occurs, and some of the energy is reflected back toward transmission bar 20 along path 48. Those skilled in the art will recognize that longitudinal waves traveling along path 48 that strike surface 46 will be transmitted as shear waves along path 42 and reflected as longitudinal waves along path 38, thereby striking transducer 34, which converts the sonic signal to an electrical signal.

Figure 3:
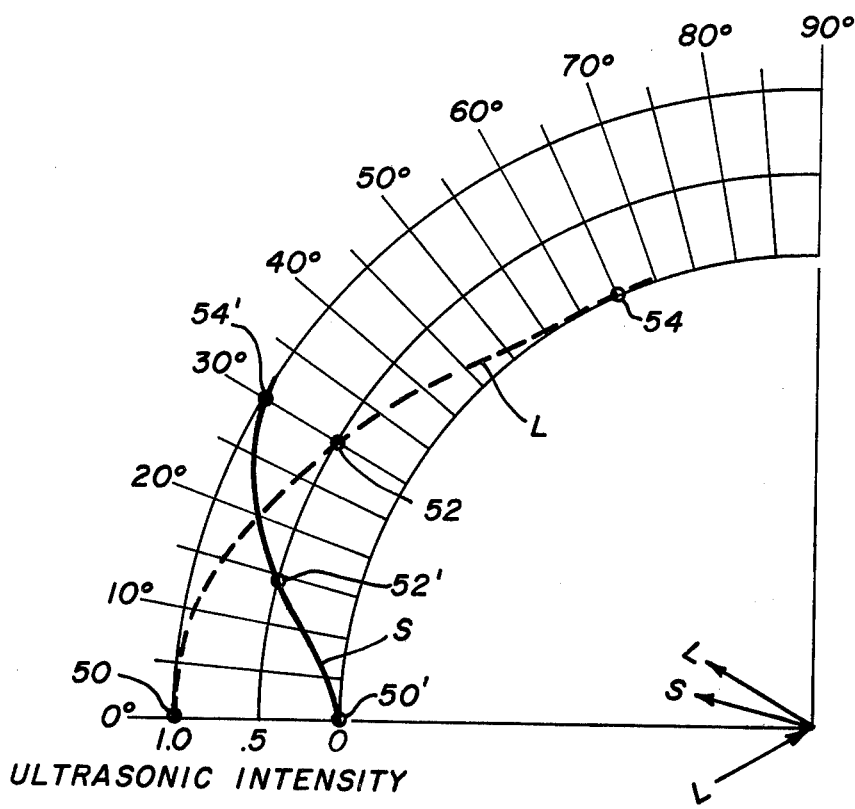
FIG. 3 is a graph showing the angles and intensities of reflected shear and longitudinal waves produced by an incident longitudinal wave striking a steel-air interface.

As was mentioned before, the angle between path 38 and surface 40 is chosen so as to cause longitudinal waves taking path 38 to be reflected as shear waves. An appropriate angle between path 38 and the normal to surface 40 can be determined by referring to FIG. 3. FIG. 3 shows the distribution of energy between reflected longitudinal waves and reflected shear waves when a longitudinal wave is incident upon a steel-air interface. It assumes a specific type of steel at a specific temperature, but the general shape of the curve is indicative of the way in which the apportionment of reflected energy responds to the incident angle. Line S gives the percentage of total energy in the reflected shear wave for various angles, and line L gives the percentage of energy in the reflected longitudinal wave. Point 50 shows that when the reflected longitudinal wave is at zero degrees from the normal, all of the energy is in the longitudinal wave. Corresponding shear-wave point 50' shows that none of the energy is in the reflected shear wave. Thus, for an incident longitudinal wave at zero degrees from the normal, all of the reflected energy will be in a longitudinal wave.

Point 52 gives the percentage of reflected energy in the reflected longitudinal wave when the reflected longitudinal wave and, consequently, the incident longitudinal wave are 30 degrees from the normal. It shows that half the energy is in the reflected longitudinal wave. This agrees with the corresponding shear-wave point 52', which indicates that the other half of the energy is in the reflected shear wave. Point 54 shows that for an incident longitudinal wave of 65 degrees, the amount of reflected longitudinal-wave energy is negligible. It can now be seen why the angle chosen in FIG. 2 is 65 degrees. As point 54' shows, virtually all of the energy is in the reflected shear wave, which has an angle of 30 degrees with the normal.

FIG. 3 also shows that there is a rather wide range of incident angles for longitudinal waves that result in substantially all of the sound energy being reflected as shear waves. Under the specific material and temperature conditions illustrated, incident longitudinal-wave angles between approximately 50 degrees and 90 degrees result in almost all of the energy being transmitted as shear waves, the range of resulting shear-wave angles being concentrated in a small neighbourhood around 30 degrees. Referring to FIG. 2 again, it can be seen that, if transducer 34 is translated along surface 36, the angle at which the shear waves are reflected from surface 40 can be varied through a narrow range. This fact can be important, since the angle at which it is desired for the shear waves to hit surface 46 varies with the temperature of the coolant.

Figure 4:
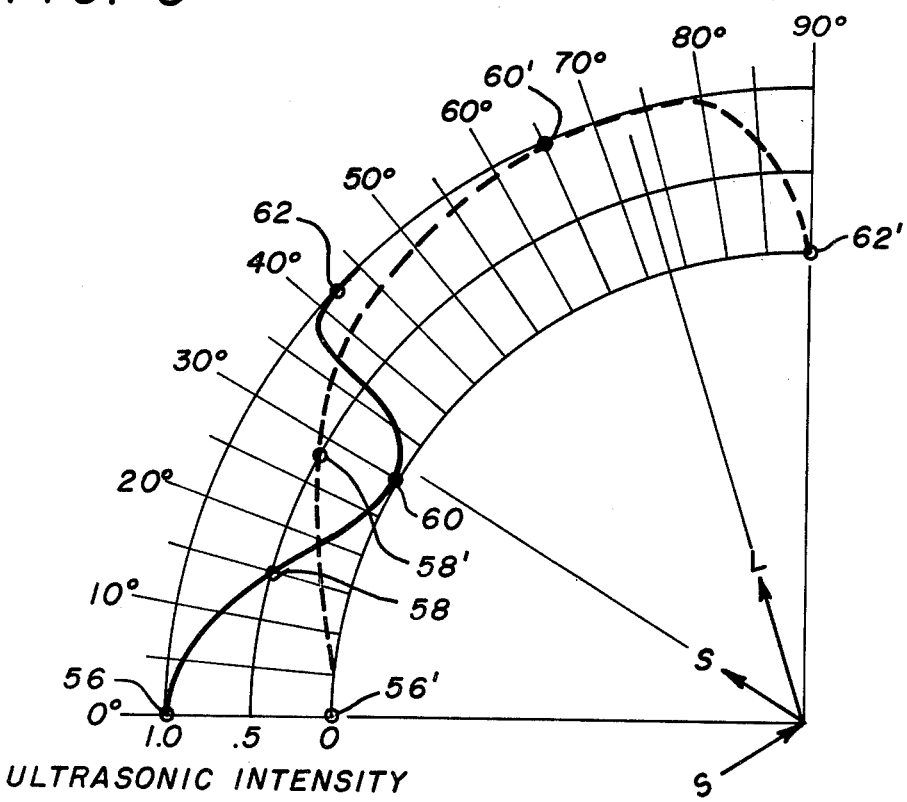
FIG. 4 is a graph showing the angles and intensities of reflected shear and longitudinal waves produced by an incident shear wave striking a steel-air interface.

Angles chosen for effective conversion from longitudinal waves to shear waves at interface 40 are also effective for conversion back from shear waves to longitudinal waves, as the diagram in FIG. 4 indicates. FIG. 4 is similar to FIG. 3, except that in FIG. 4 an incident shear wave, rather than an incident longitudinal wave, is assumed. A reflected shear wave having an angle of zero degrees with the normal is represented by point 56, which indicates that all of the reflected energy is in the reflected shear wave; point 56' indicates that none is in the reflected longitudinal wave. Point 58 indicates that incident and reflected shear waves of 15 degrees result in half the reflected energy being in the reflected shear wave, while point 58' indicates that the rest of the energy will be in a reflected longitudinal wave having an angle of 27 degrees with the normal. It can be seen that point 60, which corresponds to a shear-wave angle of 30 degrees, represents a desirable range of operation. Corresponding point 60' indicates that the desirable range results in a reflected longitudinal wave having an angle of 65 degrees with the normal. Since this is in the desired operating range for the transmission part of the transmission-bar operation, as was seen at point 54 of FIG. 3, it is apparent that the angle chosen for transmission is also suitable for reception. In general, it can be seen from FIG. 4 that longitudinal angles between about 50 degrees and 80 degrees are best for path 38.

Once the range of angles for interface 40 is chosen, it is left to choose the range of angles for interface 46. In the measuring of coolant flow in a nuclear reactor, the application for which the present invention finds its primary use, it is desirable that path 48 be close to parallel to the mean flow of coolant. While it may be desired to aim the sound waves in the coolant toward various areas of the coolant conduit, the various areas to be aimed at all require paths that only deviate a little from a path parallel to the coolant flow. Accordingly, the design of surface 46 is accomplished by determining which angle between shear-wave path 42 and surface 46 provides the best transmission of energy into the coolant, providing surface 46 at that angle to path 42, and then orienting the transmission bar so that resultant path 48 is parallel to the coolant flow.

Figure 5:
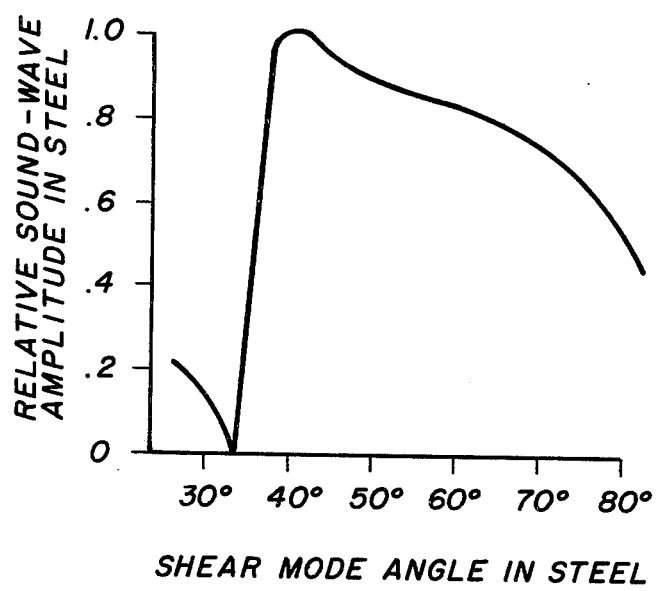
FIG. 5 is a graph showing the relative amplitude of a shear wave transmitted from water to steel across water-steel interface as a function of the shear-mode angle in the steel.
Figure 5:
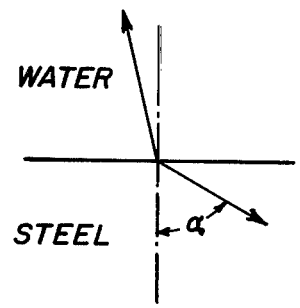

FIG. 5 shows the relative effectiveness of transmission from water into steel (or, consequently, from steel into water) for various angles of the shear-mode waves in the steel. Again, specific material and temperature conditions are assumed, but the curve is indicative of the general response of the apportionment of transmitted energy to variations in incident angle. The minimum effectiveness, at just over 30 degrees, is a point of total internal reflection within the water medium. Sound waves impinging upon the interface from the water side at an angle that Snell's Law dictates would result in an angle of approximately 33 degrees will not transmit any energy into the steel; the waves will be totally reflected back into the water. At angles greater than approximately 33 degrees, no longitudinal-wave energy is transferred into the steel; only shear-mode waves are transmitted. It is apparent, therefore, that only angles above that corresponding to total internal reflection are of interest. Accordingly, FIG. 2 shows an angle of 45 degrees between path 42 and the normal to interface 46.

Once the angle between path 42 and interface 46 has been determined, it only remains to find the proper orientation of the transmission bar with respect to the coolant flow. This is determined by using Snell's Law to figure the angle of refraction that defines path 48. Snell's Law is:

$$\text{Sin } \theta_A / \text{Sin } \theta_B = v_A / v_B,$$

where $\theta_A$ is the angle between the path and a normal to the interface in one medium, $\theta_B$ is the angle in the second medium, $v_A$ is the velocity in the first medium, and $v_B$ is the velocity in the second medium. Given that the velocity of longitudinal waves in water at 550° F is 0.0386 inches per microsecond and the speed of shear waves in steel is 0.127 inches per microsecond, then, assuming a shear-mode angle in steel of 45 degrees, the application of Snell's Law becomes $$\theta_{coolant} = \arcsin\left[\left(\frac{.0386}{.127}\right)\sin 45°\right] = 12°.$$

Thus, the angle shown in FIG. 2 is 12°.

Figure 6:
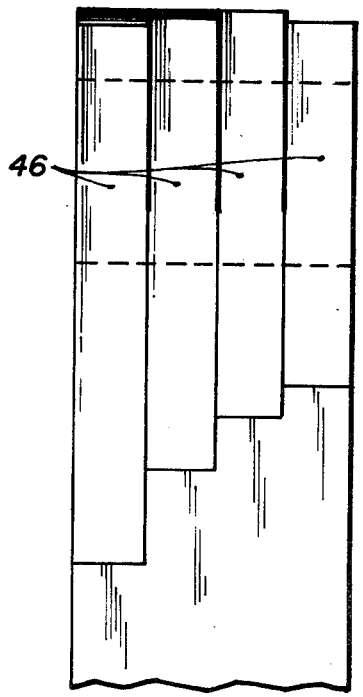
FIG. 6 is an end view of the alternate version of the transmission surface of the transmission bar of the present invention.
Figure 7:
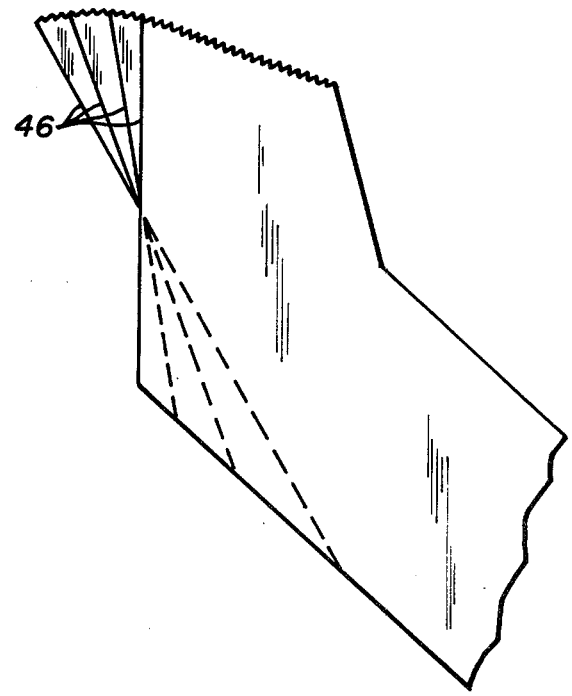
FIG. 7 is a side view of the alternate transmission surface.

It is to be noted that a coolant temperature was assumed in the preceding Snell's-Law calculation. It is expected that coolant temperature will vary, however, and so, in order to keep the ultrasonic path substantially parallel to the coolant path, it may be necessary to vary the orientation of interface 46 with respect to the direction of coolant flow. FIGS. 6 and 7 show one scheme for accomplishing this. FIG. 6 is an end view of a composite of several alternate transmission surfaces corresponding to surface 46 of FIG. 2. As can be seen in FIG. 7, which is a side view corresponding to the left end of FIG. 2, the various surfaces 56 are oriented at various angles with the coolant flow. When different coolant temperatures cause different indices of refraction in the coolant, different surfaces 46 can be used in order to maintain approximately the same orientation of path 48. Rather than having the surfaces 46 be one composite surface having a gradual changing angle, discrete angles are used. This is because a gradually changing angle would cause a dispersion of the ultrasonic beam. Since a confined beam is desired, discrete angles are used.

The various surfaces in FIGS. 6 and 7 are used by originating the sound waves at various points on surface 36. As transducer 34 is moved to various points into and out of the page, alternate paths 38 hit alternate points on surface 40, causing alternate paths 42 to hit alternate surfaces 46. If it is not desired to have a movable transducer, several transducers 34 can be provided, each one positioned to cause sound waves to strike a different surface 46.

Given the transmission bar just described, it is possible to efficiently transmit pulses and receive echoes, thereby detecting the position of objects in the fluid. By observing the changes in positions, therefore, it would be possible to determine the velocity of the fluid.

What is claimed is:

1. An apparatus for detecting the presence of objects in a liquid medium, comprising:
   a. a solid transmission bar;
   b. a first path within the transmission bar;
   c. means for introducing longitudinal sound waves into the first transmission bar in such a manner as to cause the waves to follow the first path;
   d. a reflecting surface on the transmission bar located in the first path and oriented at such an angle with the first path as to cause longitudinal sound waves impinging on the reflecting surface from the first path to be reflected at least partially as shear waves;
   e. a second path in the transmission bar that intersects the first path at the reflecting surface and forms such an angle with the reflecting surface that shear waves reflected off the reflecting surface by longitudinal waves traveling along the first path travel along the second path;
   f. a first refraction surface on the transmission bar that forms such an angle with the second path that, when the first refraction surface is in contact with the liquid medium, shear waves traveling along the second path are transmitted into the liquid medium as longitudinal waves, the longitudinal waves thereby being propagated along a third path in the liquid medium and, when objects are encountered in the third path, causing echos that are at least partially transmitted back along the third path as longitudinal waves, transmitted back along the third path as longitudinal waves, transmitted back along the second path to the reflecting surface as shear waves, and reflected off the reflecting surface to travel back along the first path as longitudinal waves;
   g. means for sensing waves traveling back along the first path, thereby detecting echos from the objects in the third path;
   h. an alternate refraction surface on the transmission bar;
   i. an alternate second path between the alternate refraction surface and the reflection surface, the alternate second path being oriented at such an angle with the reflection surface that shear waves following the alternate second path from the alternate refraction surface to the reflection surface are reflected at least partly as longitudinal waves, the alternate second path being oriented at such an angle with the alternate refraction surface that, when the alternate refraction surface is in contact with the liquid medium, shear waves traveling from the reflecting surface to the alternate refracting surface along the alternate second path are transmitted into the liquid medium along an alternate third path as longitudinal waves;
   j. an alternate first path in the transmission bar that meets the alternate second path at the reflection surface at such an angle that longitudinal waves reflected off the reflection surface by shear waves that travel along the alternate second path from the alternate refraction surface and impinge upon the reflection surface travel along the alternate first path;

k. means for introducing longitudinal sound waves into the transmission bar in such a manner as to cause them to follow the alternate first path; and l. means for sensing waves reaching a point in the alternate first path, thereby detecting echos reflected from objects in the alternate third path.

2. An apparatus as recited in claim 1, wherein the transmission bar consists essentially of steel and the liquid consists essentially of water.

3. An apparatus as recited in claim 2, wherein the angle between the first path and a line normal to the reflecting surface is between about 50 degrees and about 80 degrees.

4. An apparatus as recited in claim 3, wherein the angle between the second path and a line normal to the first refraction surface is between about 40 degrees and about 65 degrees.

* * * * *